June 26, 1951            J. S. JOHNSON            2,558,091
METHOD AND MEANS FOR DETECTING DISCHARGES
ON HIGH-VOLTAGE WINDINGS
Filed Sept. 27, 1947

WITNESSES:
Edward Michaels
Wm. C. Groome

INVENTOR
John S. Johnson.
BY
ATTORNEY

Patented June 26, 1951

2,558,091

UNITED STATES PATENT OFFICE 2,558,091

METHOD AND MEANS FOR DETECTING DISCHARGES ON HIGH-VOLTAGE WINDINGS

John S. Johnson, Wilkinsburg, Pa., assignor to Westinghouse Electric Corporation, East Pittsburgh, Pa., a corporation of Pennsylvania Application September 27, 1947, Serial No. 776,460

6 Claims. (Cl. 175—183)

The present invention relates to a method and means for detecting the presence of electrical discharges on the windings of high-voltage dynamo-electric machines, and for locating the particular coil or coils of the winding on which such discharges are occurring.

The invention is intended for use in detecting the presence of discharges in the slots of high-voltage dynamo-electric machines, such as large generators, in which a winding consisting of a large number of insulated coils is located in slots in a core, and which operate at such high voltages that electrical discharges may occur in the small air gaps between the surfaces of the coil-sides and the slot walls, which are at ground potential.

It is common practice in such machines to provide a conducting coating, or surface layer, on the insulation of the coil sides which lie in the slots. If the conducting coating of a coil is in good, solid contact with the slot wall in even a few places, the conducting coating is maintained at ground potential, and all of the voltage stress between the coil conductor and ground is applied across solid insulation, so that no discharges occur in the slot. It sometimes happens, however, that the conducting coating of one or more coils loses contact entirely with the slot wall, or makes only high-resistance contacts, either as a result of irregularities in manufacture, or of some condition occurring after the machine is in service. If this occurs, a part of the voltage stress between the conductor and ground is applied across the small air gap between the surface of the insulation and the slot wall, and electrical discharges of a very vicious nature occur which are extremely harmful to the insulation and which lead to early failure of the insulation, with resultant grounding of the coil. These discharges, being within the slot, are not detectable by visual observation of the machine, and they have no detectable effect on the operation or performance of the machine until insulation failure actually occurs. Some means of detecting the existence of discharges of this type in the slots is highly necessary, therefore, so that corrective measures can be taken before serious damage is done.

The problem of detecting these discharges in the slots is somewhat complicated by the fact that the usual solid insulation of the coils contains small voids, which are of sufficient size and number to cause ionization at operating potentials, resulting in discharges within the internal structure of the insulation itself. These internal discharges are of a mild nature and have no objectionable effect on the life of the insulation. It is necessary, therefore, to be able to distinguish between these unobjectionable internal discharges and the harmful external discharges in the slots which it is desired to detect.

The principal object of the present invention is to provide a method and means for detecting the occurrence of electrical discharges on the windings of high-voltage dynamo-electric machines.

A further object of the invention is to provide a method and means for detecting the occurrence of electrical discharges on the windings of high-voltage dynamo-electric machines, which is capable of distinguishing between internal discharges within the solid insulation and discharges in the slots external to the insulation.

Another object of the invention is to provide a method and means for detecting the occurrence of electrical discharges on the windings of high-voltage dynamo-electric machines, and for also locating the particular coil or coils of the winding which are involved.

More specifically, the object of the invention is to provide a method and means for detecting electrical discharges on the windings of high-voltage dynamo-electric machines by observing the high-frequency components of the voltage between the insulated conductors and ground, when the conductors are energized with a normal-frequency voltage, and in which calibrating means are provided for distinguishing the high-frequency voltage components due to internal discharges within the insulation from those due to external discharges between the surface of the insulation and the slot wall. The invention also includes means for examining each individual coil of the winding in this way to locate the particular coil or coils involved, after it has been determined by tests of the complete winding that harmful discharges are occurring.

The invention will be more fully understood from the following detailed description, taken in connection with the accompanying drawing, in which.

Figure 1:
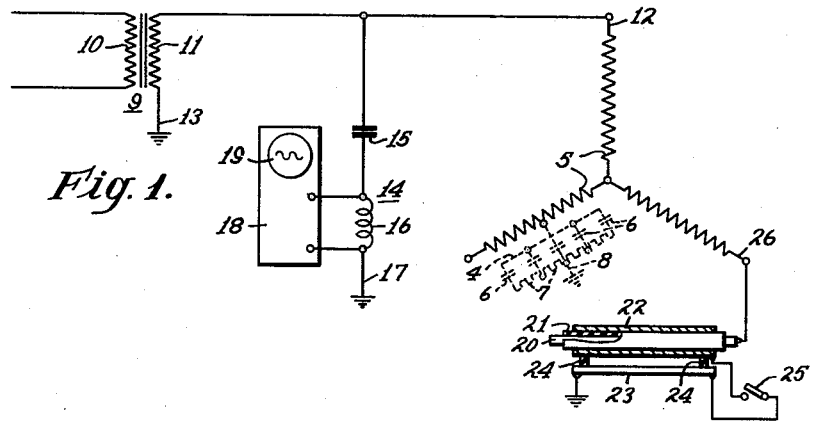
Figure 1 is a schematic diagram showing a simple embodiment of the invention.
Figure 2:
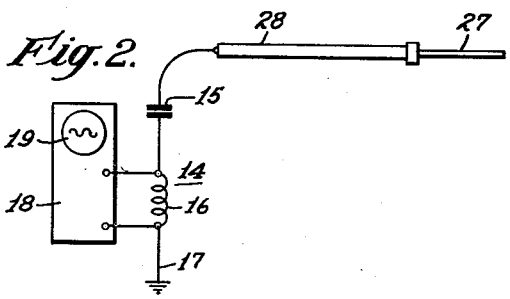
Fig. 2 is a diagrammatic view showing the means for locating the individual coil or coils on which discharges are occurring.

Referring first to Fig. 1, the invention is shown in a relatively simple embodiment as applied for the detection of electrical discharges on the winding 5 of a high-voltage dynamo-electric machine. The machine may be of any type, such as a large generator, operating at a high enough voltage to make the existence of discharges on the windings possible. The winding 5 is shown diagrammatically but it will be understood that it comprises a plurality of insulated coils disposed in slots in a core and connected together in any suitable or usual manner to form the machine winding.

The equivalent circuit of a single coil 4 of the winding 5 is shown in dotted lines in Fig. 1. The parallel-connected capacitors 6 represent the solid insulation covering the coil, and the resistance 7, to which all the capacitors 6 are connected, represents the conducting surface coating applied to the insulation, which is grounded at 8 by its contact with the wall of the slot in which the coil is placed. It will be apparent that when the conducting coating is solidly grounded, all the voltage stress between the coil conductor and ground is applied across the solid insulation and no discharges can occur in the slot. If the connection to ground is interrupted, however, or is made only through high resistance, an appreciable part of the voltage stress will be across the air gap between the conducting coating and ground. The narrow air gap will break down under this voltage, and the distributed capacitance to ground of the coil 4, represented by the capacitors 6, discharges to ground. It is the purpose of the present invention to detect the occurrence of such discharges, which are very harmful to the insulation.

In carrying out the method of the present invention, the winding 5 is energized by means of a transformer 9, the primary 10 of which is connected to a suitable source of supply voltage of the normal frequency for which the machine to be tested is designed, usually 60 cycles per second. One end of the secondary winding 11 of the transformer 9 is connected to a terminal 12 of the winding 5 and the other end of the secondary winding 11 is grounded at 13. Thus, the transformer 9 applies a voltage to ground across the winding 5 which is preferably made equal to, or of the same order of magnitude as, the normal rated operating voltage of the winding 5.

To detect the presence of discharges on the winding 5, there is provided a test circuit 14, consisting of a capacitor 15 and an air-core inductance coil 16 connected in series. The free end of the inductance coil 16 is connected to ground at 17, and the other end of the circuit is connected to the terminal 12 of the winding 5, so that the test circuit 14 is in parallel with the winding to be tested. The capacitance and inductance values of the capacitor 15 and coil 16 are chosen so that the test circuit 14 is tuned to substantially exclude the normal-frequency voltage supplied by the transformer 9, so that the test circuit 14 is responsive only to the high-frequency components of the voltage between the conductors of the winding 5 and ground. The cathode-ray oscilloscope 18 is connected to observe the voltage across the coil 16. The oscilloscope 18 may be of any suitable type which produces a trace on its screen 19 showing the wave form of the voltage across the coil 16.

As previously indicated, the solid insulation used on the coils of the winding 5 contains internal voids of such size and number that mild internal discharges occur within the solid insulation. These internal discharges are of relatively high frequency, which may be of the order of 4,000 to 10,000 cycles per second, and of relatively small magnitude. Thus, the high-frequency voltage components across the coil 16 which correspond to these internal discharges produce a characteristic high-frequency, low-amplitude trace on the oscilloscope screen. External discharges on the surface of the insulation, however, are of considerably lower frequency, usually of the order of 2,000 cycles per second, and the corresponding voltages across the coil 16 are usually from 10 to 50 times greater than the voltages corresponding to internal discharges. Thus, if external discharges are occurring, a relatively low-frequency trace of high amplitude appears on the oscilloscope screen, and observation of the high-frequency voltage components appearing on the oscilloscope screen when the winding 5 is energized from the transformer 9 gives a definite indication of the presence of discharges in the slots.

As indicated above, internal discharges within the solid insulation and external discharges in the slots are distinguishable by the characteristically different traces produced on the oscilloscope screen. In order to facilitate comparison of these different voltages, it is preferred to utilize a calibrating means. In the embodiment of the invention shown in Fig. 1, this calibrating means takes the form of a test bar 20, which may be a copper bar or other suitable conductor. The bar 20 is insulated with insulation 21 which is preferably exactly similar in thickness and composition to the insulation of the coils of the winding 5, and which has a conducting coating 22 applied to its outer surface corresponding to the conducting coating on the coil insulation of the winding 5, the thickness of the coating 22 being greatly exaggerated in the drawing. Thus, the test bar 20 precisely simulates a coil side of the winding 5. The test bar 20 is placed adjacent a grounded conducting plate 23 and spaced from it by insulating spacers 24 a distance substantially equal to the average width of the air gap between the coil sides and the slot walls of the winding 5, which may be, for example, of the order of 0.010 to 0.015 inch. The width of this air gap is also greatly exaggerated in the drawing for the sake of clarity.

The grounded plate 23 is electrically connected to the conducting coating 22 through a switch 25, and the test bar 20 is connected to a terminal 26 of the winding 5, which is preferably a different terminal than the terminal 12 to which the transformer 9 is connected. It will be seen that when the switch 25 is closed, the conducting coating 22 is directly grounded and no discharges occur from the coating 22 to ground. When the switch 25 is opened, however, to disconnect the coating 22 from ground, discharges will occur between the coating 22 and the plate 23 which are exactly similar in nature to those which may occur in the slots of the machine. Thus, the test bar 20 provides a calibrating means which simulates a coil of the winding 5 and in which discharges can be produced which are of the same nature as those which may occur in the machine.

In order to detect the presence of discharges on the winding 5, the transformer 9, the test circuit 14 and the test bar 20 are connected to the winding 5, as shown in Fig. 1. When the test circuit 14 is connected to the terminal 12, a voltage wave will appear on the oscilloscope screen 19 corresponding to the high-frequency voltage across the coil 16. The test bar 20 may then be utilized to determine whether this voltage wave indicates internal discharges within the insulation or the objectionable external slot discharges which it is desired to detect. Thus, if the switch 25 is opened, discharges occur from the test bar 26 to the grounded plate 23 similar to slot discharges on the winding 5, and the voltage wave which appears on the oscilloscope screen will be of the characteristic amplitude and frequency corresponding to these discharges. When the switch 25 is closed, to suppress the discharges from the test bar, if the only discharges occurring are internal discharges within the solid insulation of the winding 5, the voltage wave on the oscilloscope screen will change in appearance, being of much smaller amplitude and higher frequency. If, however, external discharges are occurring on the coils of the winding 5, the voltage trace on the oscilloscope screen will not change substantially when the switch 25 is closed. Thus, the presence of discharges on the winding 5 can readily be detected by comparing the voltage waves on the oscilloscope screen with the switch 25 closed and open. If no substantial change occurs in the voltage wave when the switch 25 is closed, the presence of external slot discharges on one or more of the coils of the winding 5 is clearly indicated.

When it has been determined by the means described above that objectionable discharges are occurring on the winding 5, it is then desirable to locate the particular coil or coils involved. As a preliminary step to doing this, it may sometimes be desirable to open up the connections of the winding 5 and apply the test described above to the individual phases or coil groups of the winding to narrow down the search for the particular coils involved. This is not always a necessary or desirable step and may be omitted if the number of coils is not too great. In order to locate the particular individual coil or coils on which discharges are occurring, the test circuit 14 is disconnected from the winding terminal 12 and connected to a conducting probe 27, which is provided with an insulating handle 28 for manual operation. The probe 27 is then applied to the conducting coating of a coil of the winding, the transformer 9 being still connected as shown in Fig. 1, and the voltage trace on the oscilloscope screen 19 observed. The test bar 20 may be utilized, if desired, in the manner described above to enable a comparison between a coil which is discharging and one which is not discharging. It will be found, however, that after a little experience the test bar is not needed in examination of the individual coils in this manner, and observation of the oscilloscope screen will readily show whether or not the particular coil is discharging to ground.

The probe 27 is successively applied to the conducting coatings of all of the individual coils of the winding 5, and in this manner the coil or coils which are discharging can readily be located. In some instances, it may be necessary to remove the slot wedges in order to obtain access to the coils for the probe 27, but in many cases, if the probe 27 is suitably designed, it may be made to contact the conducting surfaces of the coils without removing the slot wedges. It will be seen, therefore, that in this way the presence of discharges is readily detectable, and the particular coil or coils involved are easily located, so that corrective steps can be taken before the insulation is seriously damaged.

The high-frequency voltage of the discharges in the slots of a large machine may be relatively low, being as low as 200 volts in some cases. Some machines, such as large water-wheel generators, for example, may have several hundred coils in the stator winding, and if only one of these coils is discharging, the high-frequency voltage at the machine terminal which must be detected and observed may be only a fraction of a volt. In such cases the simple circuit shown in Fig. 1 is not entirely satisfactory, since the tuned test circuit 14 gives only a small amplification of the high-frequency voltage at the terminal 12, and the air-core inductance coil 16 is not very selective as to frequency, so that it becomes difficult to observe the high-frequency voltage.

Figure 3:
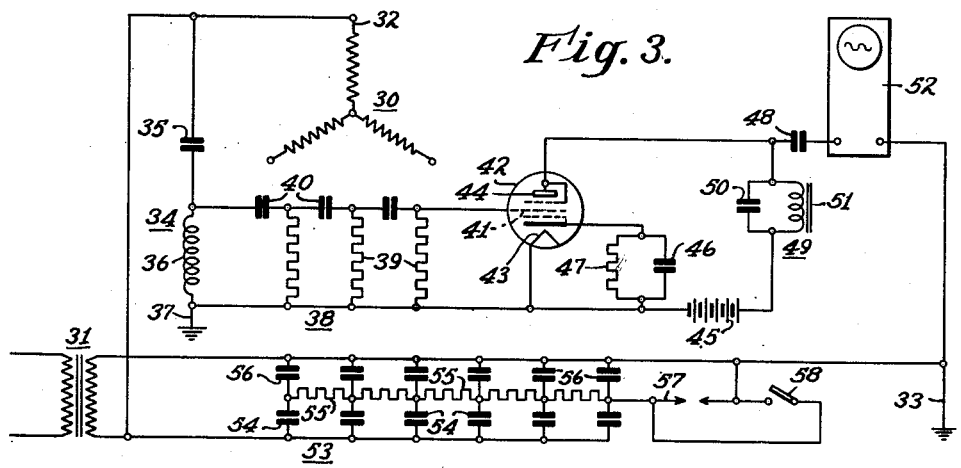
Fig. 3 is a schematic diagram showing a more elaborate embodiment of the invention.

The embodiment of the invention shown in Fig. 3 provides a more sensitive and satisfactory circuit for carrying out the method of the present invention. In this embodiment of the invention the winding 30 of the machine to be tested is energized as before by a transformer 31, which applies a normal-frequency voltage, of the same order of magnitude as the rated voltage of the winding, to the winding terminal 32, the other side of the transformer secondary being grounded at 33. The high-frequency components of the voltage between the winding conductors and ground are observed by means of a test circuit 34 comprising a capacitor 35 and air-core inductance coil 36, which are connected in series between the winding terminal 32 and ground 37. As before, the test circuit 34 is tuned to substantially eliminate the normal-frequency components of the voltage between the winding conductors and ground, so that the circuit 34 is responsive only to the high-frequency voltage components. The tuned circuit 34 has a small amplifying effect on the high-frequency voltage, but as indicated above, this amplifying effect is not sufficiently great, and the selectivity of the circuit 34 is not good enough, for satisfactory results when the magnitude of the voltage is relatively low.

In the embodiment of Fig. 3, therefore, a filter circuit 38 is provided, consisting of a plurality of resistors 39 and capacitors 40 connected in any suitable or usual manner to exclude the components of undesired frequency. The filter circuit 38 is connected across the inductance coil 36, and the output voltage on the high voltage or ungrounded side of the filter circuit 38 is applied to the control grid 41 of a pentode amplifier tube 42. The pentode 42 is utilized to amplify the output voltage of the filter circuit 38, and is shown as being connected in a more or less usual manner, the cathode 43 being connected to the grounded or low voltage side of the filter circuit 38, and the anode voltage being supplied to the anode or plate 44 by means of a battery 45. The usual bypass capacitor 46 and parallel resistor 47 are also provided.

The amplified anode voltage, or output voltage, of the pentode 42 is applied to one terminal of a blocking capacitor 48. A tuned circuit 49, comprising a parallel-connected capacitor 50 and iron-core inductance coil 51, is connected in series with the anode 44, and is tuned to substantially the same frequency as the tuned series circuit 34, so as to bypass components of undesired frequencies in the output voltage of the pentode 42, and thus improve the sensitivity of the system. A cathode ray oscilloscope 52 is connected to observe the voltage between the other terminal of the capacitor 48 and ground 33. It will be apparent that this circuit may be utilized to detect the presence of discharges on the winding 30 in the same manner as the circuit of Fig. 1, but that it is much more sensitive since the voltage across the coil 36 is not observed directly, but undesired components are excluded by the filter circuit 38, and the voltage is amplified by the pentode 42, so that the system is much more sensitive and has much greater selectivity than the simple circuit of Fig. 1.

Even with the greater selectivity of the circuit of Fig. 3, it is frequently desirable to utilize a calibrating means for distinguishing between internal discharges within the insulation and external slot discharges. For this purpose, a calibrating circuit 53 is provided which corresponds in function and characteristics to the test bar 20 of Fig. 1. The calibrating circuit 53 comprises a plurality of parallel-connected capacitors 54, which represent the coil insulation, and which may be connected to the high voltage side of the secondary winding of the transformer 31, as shown, or to a terminal of the winding 30. The capacitors 54 are connected in parallel to a plurality of series-connected resistors 55, which represent the conducting surface coating of the coil insulation, and a second group of paralleled capacitors 56 is connected between the resistors 55 and ground to represent the air gap between the conducting coil surface and the slot wall. An adjustable spark gap 57 is connected in parallel with the capacitors 56 between the resistors 55 and ground, and a switch 58 is connected across the gap 57 to short-circuit it and connect the resistors 55 directly to ground.

It will be apparent that the operation of the calibrating circuit 53 is essentially the same as that of the test bar 20. Thus, when the switch 58 is open, the spark gap 57 will discharge in a manner similar to the discharges which may occur on the winding 30, while when the switch 58 is closed, the resistors 55 are connected directly to ground and no discharges occur in the gap 57. Thus, the calibrating circuit 53 simulates a coil side of the winding 30 in the same manner as the test bar 29, and discharges to ground can be produced in the calibrating circuit 53 which are of the same nature as discharges on the winding 30.

The use of the circuit shown in Fig. 3 is exactly the same as that of the circuit of Fig. 1. Thus, the test circuit 34 is connected to the terminal 32 of the winding 30 and the voltage trace on the screen of the oscilloscope 52 is observed to show whether or not discharges are occurring. If it is desired to utilize the calibrating circuit 53, the switch 58 is first opened, so that the gap 57 discharges and the corresponding voltage wave on the oscilloscope screen is observed. The switch 58 is then closed to stop the discharges in the gap 57, and if the voltage wave on the oscilloscope screen remains the same as before, the presence of objectionable discharges on the winding 30 is indicated, while if it changes to a much lower magnitude and higher frequency when the switch is closed, the absence of such discharges is indicated. If discharges are found to exist on the winding 30, the test circuit 34 may be disconnected from the terminal 32 and connected to a probe for individual examination of each coil of the winding in the manner previously described.

It should now be apparent that a method and means have been provided for detecting the presence of electrical discharges on the windings of high-voltage dynamo-electric machines, and for locating the particular coil or coils involved. It will also be apparent that various modifications may be made within the scope of the invention. Thus, if there are objectionable harmonics in the supply voltage to which the transformers 9 or 31 are connected, a suitable filter circuit may be connected across the secondary of the transformer to bypass them. In the embodiment of Fig. 3, it may sometimes be desirable to provide for adjustment of the calibrating circuit 53 to correspond to the varying characteristics of different machines to be tested, and this may readily be done by providing means for connecting or disconnecting individual capacitors and resistors. In most cases, however, this is unnecessary since the insulation characteristics of different high-voltage machines do not greatly differ. It will be obvious, therefore, that the invention is not limited to the specific details shown and described, but in its broadest aspects, it includes all equivalent embodiments and modifications which come within the scope of the appended claims.

I claim as my invention:

1. The method of detecting electrical discharges on the insulated windings of high-voltage dynamo-electric machines which comprises connecting to the winding of a machine a device for producing discharges to ground of the same nature as discharges on the machine windings, applying a normal-frequency voltage between the winding and ground, and comparing the high-frequency components of the voltage between the winding conductors and ground when said device is discharging and when said device is not discharging.

2. The method of detecting electrical discharges on the insulated windings of high-voltage dynamo-electric machines which comprises connecting to the winding of a machine a device for producing discharges to ground of the same nature as discharges on the machine windings, applying a normal-frequency voltage between a terminal of the winding and ground, connecting between said terminal and ground a test circuit tuned to substantially exclude said normal-frequency voltage, and comparing the wave form of the voltage across a part of said test circuit when said device is discharging with the wave form of the voltage across said part of the test circuit when said device is not discharging.

3. Means for detecting electrical discharges on the windings of high-voltage dynamo-electric machines, said means comprising means for applying a normal-frequency voltage between the windings of a machine and ground, a device for producing discharges to ground of the same nature as discharges on the winding of the machine, means for connecting said device to a terminal of said winding, and means for comparing the high-frequency components of the voltage between the winding conductors and ground when said device is discharging with the high-frequency components of said voltage when the device is not discharging.

4. Means for detecting electrical discharges on the windings of high-voltage dynamo-electric machines, said means comprising means for applying a normal-frequency voltage between the winding of a machine and ground, means for simulating an insulated conductor of said winding, said last-mentioned means being adapted to be connected to the winding, means for causing said conductor-simulating means to discharge to ground, a test circuit comprising a capacitor and an air-core inductance coil in series, one end of said test circuit being grounded, means for connecting the other end of the test circuit to the winding, and an oscilloscope connected to observe the voltage across said coil.

5. Means for detecting electrical discharges on the windings of high-voltage dynamo-electric machines, said means comprising means for applying a normal-frequency voltage between the winding of a machine and ground, means for simulating an insulated conductor of said winding, said last-mentioned means being adapted to be connected to the winding, means for causing said conductor-simulating means to discharge to ground, a test circuit comprising a capacitor and an air-core inductance in series, one end of said test circuit being grounded, means for connecting the other end of the test circuit to said winding, a filter circuit connected across said coil for excluding components of undesired frequency from the voltage across the coil, and means for observing the output voltage of the filter circuit.

6. Means for detecting electrical discharges on the windings of high-voltage dynamo-electric machines, said means comprising means for applying a normal-frequency voltage between the winding of a machine and ground, means for simulating an insulated conductor of said winding, said last-mentioned means being adapted to be connected to the winding, means for causing said conductor-simulating means to discharge to ground, a test circuit comprising a capacitor and an air-core inductance in series, one end of said test circuit being grounded, means for connecting the other end of the test circuit to said winding, a filter circuit connected across said coil for excluding components of undesired frequency from the voltage across the coil, means for amplifying the output voltage of the filter circuit, and an oscilloscope connected to observe the amplified voltage.

JOHN S. JOHNSON.

REFERENCES CITED

The following references are of record in the file of this patent:

UNITED STATES PATENTS

| Number | Name | Date |
|---|---|---|
| 1,588,186 | Hartley | June 8, 1926 |
| 2,032,904 | Bellaschi | Mar. 3, 1936 |
| 2,087,783 | Savage | July 20, 1937 |
| 2,185,292 | Candler et al. | Jan. 2, 1940 |
| 2,321,424 | Rohats | June 8, 1943 |
| 2,324,835 | Hagenguth | July 20, 1943 |
| 2,380,791 | Rosencrans | July 31, 1945 |

OTHER REFERENCES

Article titled "Winding Fault Detection and Location by Surge Comparison Testing" by Moses and Harter in Electrical Engineering Transactions for July 1945, vol. 64, pages 499 to 503.